United States Patent
Tseng et al.

(10) Patent No.: US 11,606,054 B2
(45) Date of Patent: Mar. 14, 2023

(54) MOTOR CONTROL METHOD

(71) Applicant: DELTA ELECTRONICS, INC., Taoyuan (TW)

(72) Inventors: Shao-Kai Tseng, Taoyuan (TW); Yu-Shian Lin, Taoyuan (TW); Chen-Yeh Lee, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/645,997

(22) Filed: Dec. 27, 2021

(65) Prior Publication Data

US 2022/0376640 A1    Nov. 24, 2022

(30) Foreign Application Priority Data

May 20, 2021   (CN) .......................... 202110551910.9

(51) Int. Cl.
*H02P 21/00* (2016.01)
*H02P 21/22* (2016.01)
(Continued)

(52) U.S. Cl.
CPC .............. *H02P 21/22* (2016.02); *H02P 21/18* (2016.02); *H02P 27/08* (2013.01)

(58) Field of Classification Search
CPC ........... H02P 21/22; H02P 21/18; H02P 27/08
(Continued)

(56) References Cited

U.S. PATENT DOCUMENTS 7,999,498 B2    8/2011  Gotz et al.
9,041,325 B2 *  5/2015  Yamazaki ............... H02P 21/26
                                                    318/700

(Continued)

FOREIGN PATENT DOCUMENTS

CN        1042184 C      2/1999
CN      102714480 B      3/2015
(Continued)

OTHER PUBLICATIONS

J.-L. Chen et al, Implementation of high-performance sensorless interior permanent-magnet synchronous motor control systems using a high-frequency injection technique, IET Electr. Power Appl., 2012, vol. 6, Iss. 8, pp. 533-544 doi: 10.1049/iet-epa.2011.0303.

*Primary Examiner* — Erick D Glass
(74) *Attorney, Agent, or Firm* — CKC & Partners Co., LLC

(57) ABSTRACT

A motor control method includes the following steps: adjusting a voltage component of an estimated voltage command to a steady-state voltage value; performing a coordinate axis conversion on another voltage component of the estimated voltage command and the steady-state voltage value, and generating a three-phase excitation current to make a synchronous motor rotate to a rotating position and stop; calculating an estimated current signal; calculating an estimated value of the rotating position and adjusting the another voltage component of the estimated voltage command when determining that the current component is not maintained at a steady-state current value; calculating an effective inductance of the synchronous motor based on the steady-state voltage value, the another voltage component of the estimated voltage command, the steady-state current value, and another current component of the estimated current signal when determining that the current component is maintained at the steady-state current value.

14 Claims, 7 Drawing Sheets

(51) Int. Cl.
*H02P 27/08* (2006.01)
*H02P 21/18* (2016.01)

(58) Field of Classification Search
USPC .................................................. 318/400.02
See application file for complete search history.

(56) References Cited

U.S. PATENT DOCUMENTS

| | | | |
|---|---|---|---|
| 9,081,065 B2 | 7/2015 | Feng et al. | |
| 9,219,431 B2 * | 12/2015 | Hirono | H02P 6/186 |
| 9,335,356 B2 | 5/2016 | Adachi et al. | |
| 9,847,745 B1 * | 12/2017 | Fink | H02P 21/00 |
| 2018/0254722 A1 | 9/2018 | Umetsu et al. | |

FOREIGN PATENT DOCUMENTS

| | | | |
|---|---|---|---|
| TW | 201526520 A | 7/2015 |
| TW | 201611509 A | 3/2016 |
| TW | 201613249 A | 4/2016 |
| TW | 201620243 A | 6/2016 |

* cited by examiner

MOTOR CONTROL METHOD

CROSS-REFERENCE TO RELATED APPLICATION

This application claims priority to China Application Serial Number 202110551910.9, filed May 20, 2021, which is herein incorporated by reference in its entirety.

BACKGROUND

Field of Invention

The present disclosure relates to a motor control method. More particularly, the present disclosure relates to a motor control method used to calculate an inductance of a permanent magnet assisted synchronous reluctance motor.

Description of Related Art

When driving a motor without a position sensor (or is called an encoder), a large number of motor parameters need to be used to estimate the angle of the shaft before the motor can be driven accurately. In the conventional technology, the inverter used to drive the motor generates the corresponding stator magnetic field through the appropriate control of the stator current of the motor, and keeps the stator magnetic field and the rotor magnetic field orthogonal to each other to maintain high-efficiency operation. Generally speaking, the conventional control device estimates the rotor position of the motor based on the drive voltage, drive current and motor parameters, and appropriately adjusts the control command based on the rotor position to keep the directions of the stator magnetic field and the rotor magnetic field orthogonal to each other. Therefore, how to correctly calculate the motor parameters has become an important subject.

In the field of motor control, the motor inductance (including the d-axis inductance and the q-axis inductance) is a very important motor parameter. A permanent magnet assisted synchronous reluctance motor (PMaSynRM, hereinafter referred to as a reluctance motor) utilizes a permanent magnet material and a magnetic material (such as a silicon steel sheet, etc.) at the same time as the rotor structure of the motor. However, owing to the characteristics of the rotor structure of this motor, the inductance of the motor is related to the rotor position. Under the conventional self-learning method of the inductance parameter(s), the rotor position of the reluctance motor is difficult to be accurately aligned with the set angle, so the inductance of the motor is difficult to be accurately calculated. As a result, for the current conventional technology, it is difficult to accurately calculate the inductance of the reluctance motor (for example, the d-axis inductance, the q-axis inductance).

SUMMARY

The present disclosure provides a motor control method used for calculating an inductance of a motor. As a result, the above-mentioned problem is resolved by way of the motor control method.

A motor control method used for a synchronous motor without a position sensor is provided. The motor control method comprises: adjusting a voltage component of an estimated voltage command to a steady-state voltage value; performing a coordinate axis conversion on another voltage component of the estimated voltage command and the steady-state voltage value to generate a two-axis voltage command; generating a three-phase excitation current to drive the synchronous motor to a rotating position and stop based on a DC excitation voltage command and the two-axis voltage command; retrieving the three-phase excitation current to calculate an estimated current signal, wherein a current component of the estimated current signal corresponds to the steady-state voltage value; calculating an estimated value of the rotating position based on the estimated current signal when determining that the current component is not maintained at a steady-state current value; adjusting the another voltage component of the estimated voltage command based on the estimated value of the rotating position, so that the current component corresponding to the steady-state voltage value is maintained at the steady-state current value; and calculating an effective inductance of the synchronous motor based on the steady-state voltage value, the another voltage component of the estimated voltage command, the steady-state current value, and another current component of the estimated current command when determining that the current component is maintained at the steady-state current value.

The present disclosure provides a motor control method used for a synchronous motor. A position sensor is coupled to the synchronous motor. The motor control method comprises: adjusting a voltage component of an estimated voltage command to a steady-state voltage value; performing a coordinate axis conversion on another voltage component of the estimated voltage command and the steady-state voltage value to generate a two-axis voltage command; generating a three-phase excitation current to drive the synchronous motor to a rotating position and stop based on a DC excitation voltage command and the two-axis voltage command; retrieving the three-phase excitation current to calculate an estimated current signal, wherein a current component of the estimated current signal corresponds to the steady-state voltage value; obtaining a measured value of the rotating position through the position sensor when determining that the current component is not maintained at a steady-state current value; adjusting the another voltage component of the estimated voltage command based on the measured value of the rotating position, so that the current component corresponding to the steady-state voltage value is maintained at the steady-state current value; and calculating an effective inductance of the synchronous motor based on the steady-state voltage value, the another voltage component of the estimated voltage command, the steady-state current value, and another current component of the estimated current command when determining that the current component is maintained at the steady-state current value.

The present disclosure estimates the rotor position of the motor based on the feedback current signal containing the angular error information, and adjusts the angle of the estimated coordinate axes based on the estimated rotor position, and modifies the voltage vectors when performing the inductance testing accordingly until the position error between the estimated coordinates and the rotating position of the rotor converges within an error range. Accordingly, the motor control device can estimate the motor parameters at the correct rotor position based on the calibrated estimated coordinate axes to facilitate precise control of the synchronous motor.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

DESCRIPTION OF THE EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and elements are schematically depicted in order to simplify the drawings.

Figure 1B:
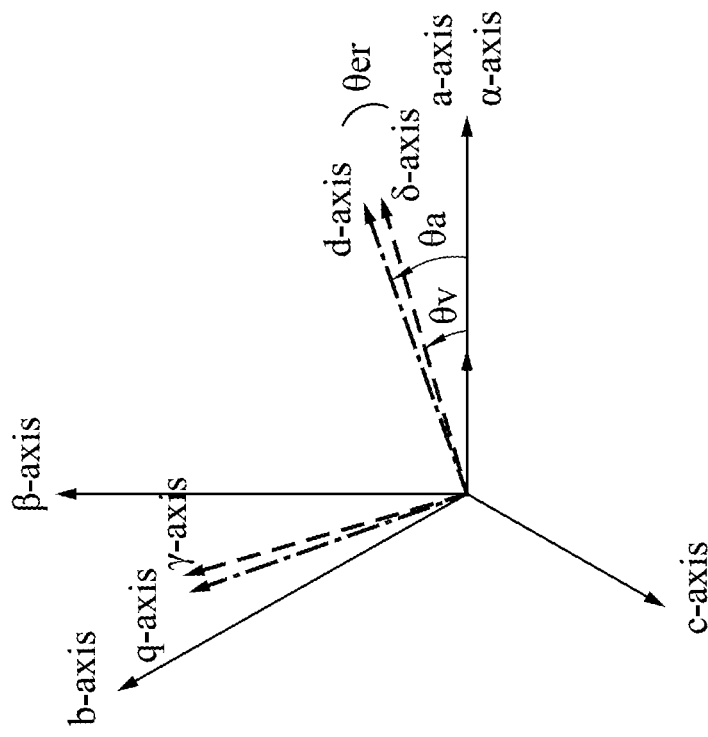
FIG. 1B depicts a schematic diagram of a coordinate axis conversion according to some embodiments of the present disclosure.
Figure 1A:
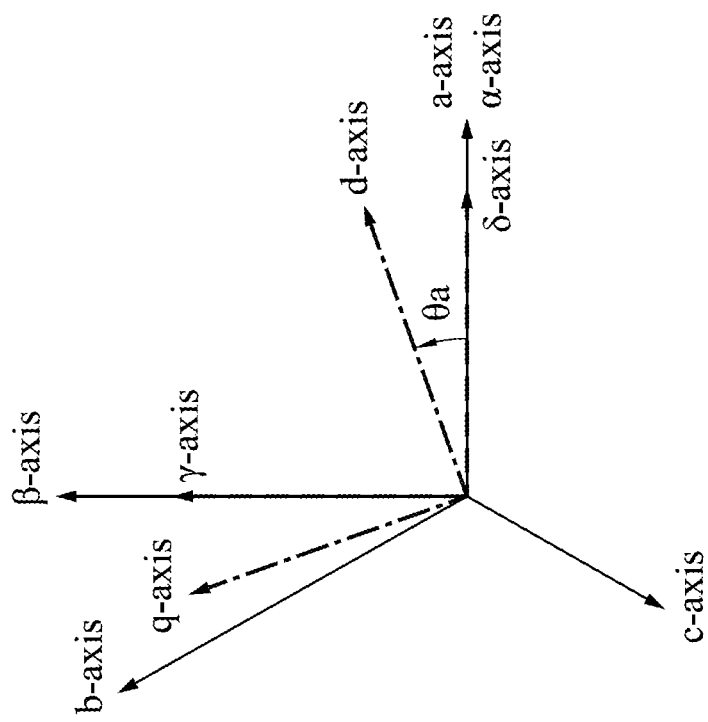
FIG. 1A depicts a schematic diagram of a coordinate axis conversion according to the conventional art.

FIG. 1A depicts a schematic diagram of a coordinate axis conversion according to the conventional art. In the field of typical motor control (including the reluctance motor control), the motion state of the motor is expressed through a conversion operation of the coordinate axes, as shown in FIG. 1A. Generally speaking, the d-axis and q-axis are synchronous coordinate axes to indicate a rotor position of the motor. Hence, when a rotating speed of a reluctance motor is zero, the synchronous coordinate axes of the reluctance motor are indicated by equation (1), as shown below:

$$\begin{bmatrix} V_d \\ V_q \end{bmatrix} = r_s \begin{bmatrix} i_d \\ i_q \end{bmatrix} + \begin{bmatrix} L_d & 0 \\ 0 & L_q \end{bmatrix} \frac{d}{dt} \begin{bmatrix} i_d \\ i_q \end{bmatrix} \quad (1)$$

In equation (1), Vd represents a voltage of the d-axis, Vq represents a voltage of the q-axis, id represents a current of the d-axis, iq represents a current of the q-axis, Ld represents an inductance of the d-axis, Lq represents an inductance of the q-axis, and rs represents a stator resistance of the stator 120 the reluctance motor.

As shown in FIG. 1A, the δ-axis and the γ-axis are estimated coordinate axes used to indicate a set rotor position of the motor (usually the rotor position recognized by a computer or a controller) or an estimated rotor position. The α-axis and the β-axis are stationary coordinate axes used to indicate a stator position of the stator 120 of the motor. The a-axis, b-axis, and c-axis represent the three-phase coordinate axes of the motor.

Owing to the structural characteristics of the reluctance motor, when a rotor of the reluctance motor is controlled to stop, Θa indicates an actual position Θa of the motor's rotor (or an angle difference between the d-axis of the synchronous coordinate axes and the a-axis of the three-phase coordinate axes), and there is a significant angular error between the estimated coordinate axes and the synchronous coordinate axes. Therefore, when equation (1) is converted to the estimated coordinate axes, equation (2) is obtained, as shown below:

$$\begin{bmatrix} V_\delta \\ V_\gamma \end{bmatrix} = r_s \begin{bmatrix} i_\delta \\ i_\gamma \end{bmatrix} + \begin{bmatrix} L_d\cos^2\theta_{er} + L_q\sin^2\theta_{er} & \frac{1}{2}(L_d - L_q)\sin 2\theta_{er} \\ \frac{-1}{2}(L_d - L_q)\sin 2\theta_{er} & L_d\sin^2\theta_{er} + L_q\cos^2\theta_{er} \end{bmatrix} \frac{d}{dt} \begin{bmatrix} i_\delta \\ i_\gamma \end{bmatrix} \quad (2)$$

In equation (2), Vδ represents a voltage of the δ-axis, Vγ represents a voltage of the γ-axis, iδ represents a current of the δ-axis, iγ represents a current of the γ-axis, Ld represents the inductance of the d-axis, Lq represents the inductance of the q-axis, rs represents the stator resistance of the reluctance motor, and Θer represents the angular error between the synchronous coordinate axes and the estimated coordinate axes of the motor.

As can be known from equation (2), since the synchronous coordinate axes indicating the rotor position of the motor are not aligned with the estimated coordinate axes, equation (2) comprises a component of the actual position Θa. If there is no position sensor, it would be difficult to obtain the actual position Θa of the rotor. Therefore, the conventional motor control method without a position sensor can not accurately estimate the d-axis inductance Ld and the q-axis inductance of the reluctance motor, so that the control efficiency of the motor is greatly reduced. As shown in FIG. 1B, the present disclosure provides a motor control device and a control method thereof. An estimated value Θv of the actual position Θa of the rotor is estimated through calculation to adjust positions of the estimated coordinate axes (the δ-axis and the γ-axis) so as to reduce the component of the actual position Θa of the rotor. In this manner, the above problem is resolved. Although there is the angular error Θer between the estimated value Θv and the actual position Θa of the rotor, the present disclosure can make the angular error Θer approach zero by way of adjusting the estimated value Θv. The implementation method of the present disclosure is described in detail as follows.

Figure 2:
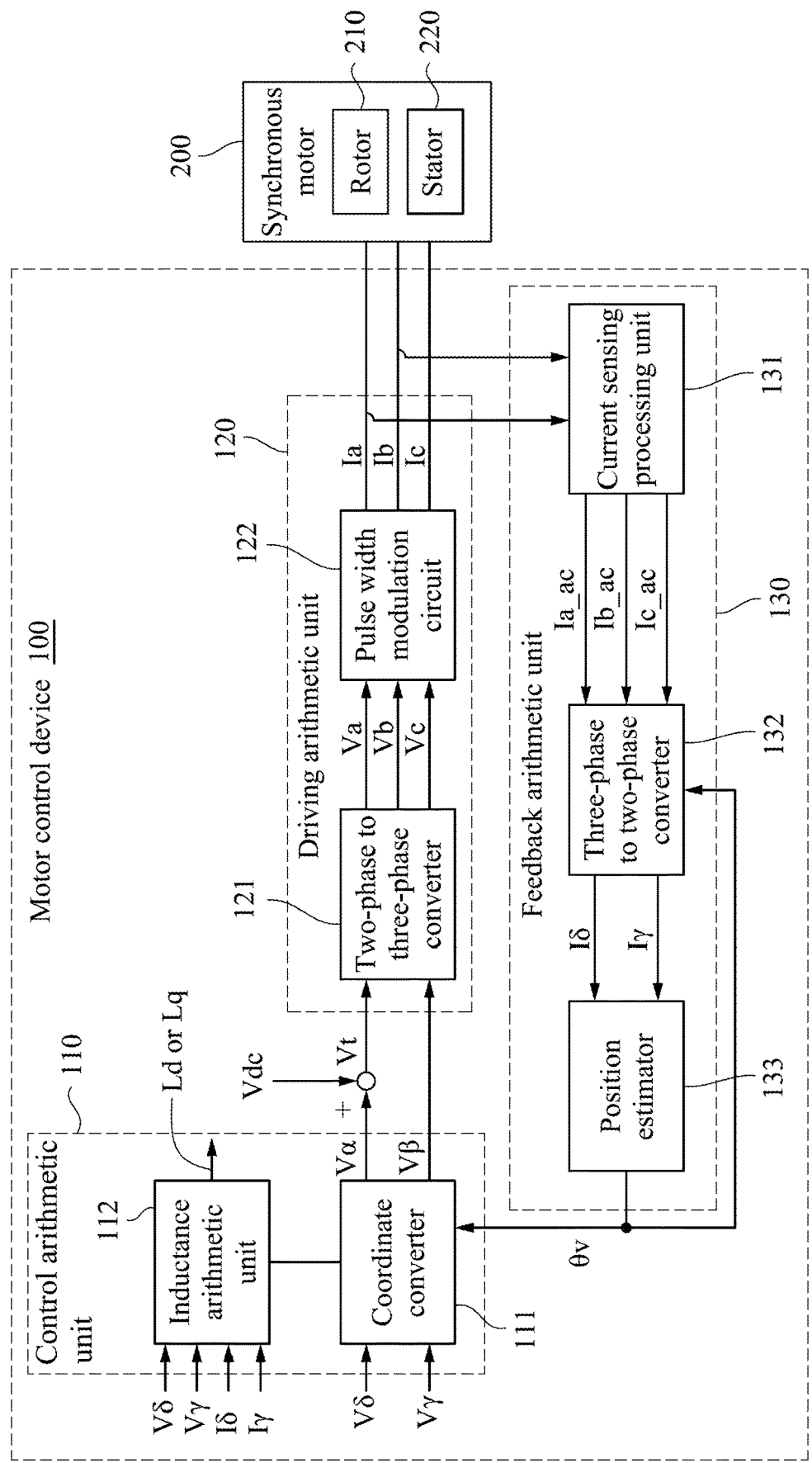
FIG. 2 depicts a schematic diagram of a motor control device according to some embodiments of the present disclosure.

FIG. 2 depicts a schematic diagram of a motor control device 100 according to some embodiments of the present disclosure. The motor control device 100 is applied to a synchronous motor 200 without a position sensor. It is noted that the synchronous motor 200 refers to a permanent magnet assisted synchronous reluctance motor. However, the present disclosure is not limited in this regard.

The motor control device 100 (or called the inverter) comprises a control arithmetic unit 110, a driving arithmetic unit 120, and a feedback arithmetic unit 130. The control arithmetic unit 110 is configured to receive an estimated voltage command (including the estimated d-axis voltage Vδ and the estimated q-axis voltage Vγ), and generate a two-axis voltage command (including a first voltage component Vα and a second voltage component Vβ)) accordingly to the driving arithmetic unit 120. The driving arithmetic unit 120 provides a three-phase excitation current Ia, Ib, Ic to the synchronous motor 200 based on the two-axis voltage command. The feedback arithmetic unit 130 retrieves the three-phase excitation current Ia, Ib, Ic of the synchronous motor 200. Then, the feedback arithmetic unit 130 generates a feedback signal to the control arithmetic unit 110 based on the three-phase excitation currents Ia, Ib, and Ic. The control arithmetic unit 110 calculates a d-axis inductance or a q-axis inductance of the synchronous motor 200 based on the above feedback signal. In the present embodiment, the two-axis voltage command (Vα, Vβ) indicates the stationary coordinate axes, so the first voltage component Vα is also called an α-axis voltage of the static coordinate axes, and the second voltage component Vβ is also called a β-axis voltage of the static coordinate axes. However, the present disclosure is not limited in this regard. It is noted that the estimated d-axis voltage Vδ, the estimated q-axis voltage Vγ, the first voltage component Vα, and the second voltage component Vβ in one embodiment are all high-frequency AC signals, but the present disclosure is not limited in this regard.

Figure 3A:
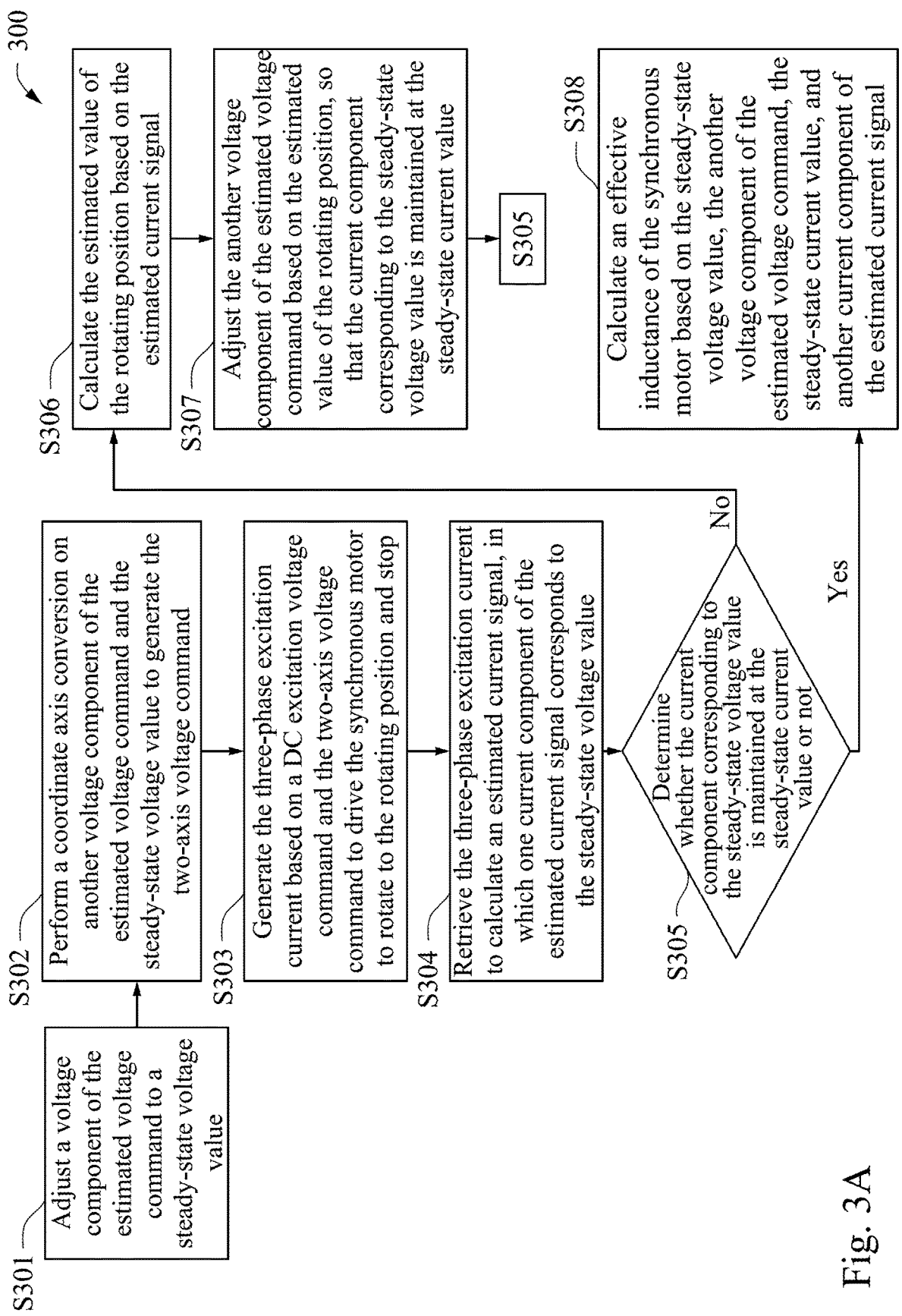
FIG. 3A depicts a flowchart of a motor control method according to some embodiments of the present disclosure.
Figure 3B:
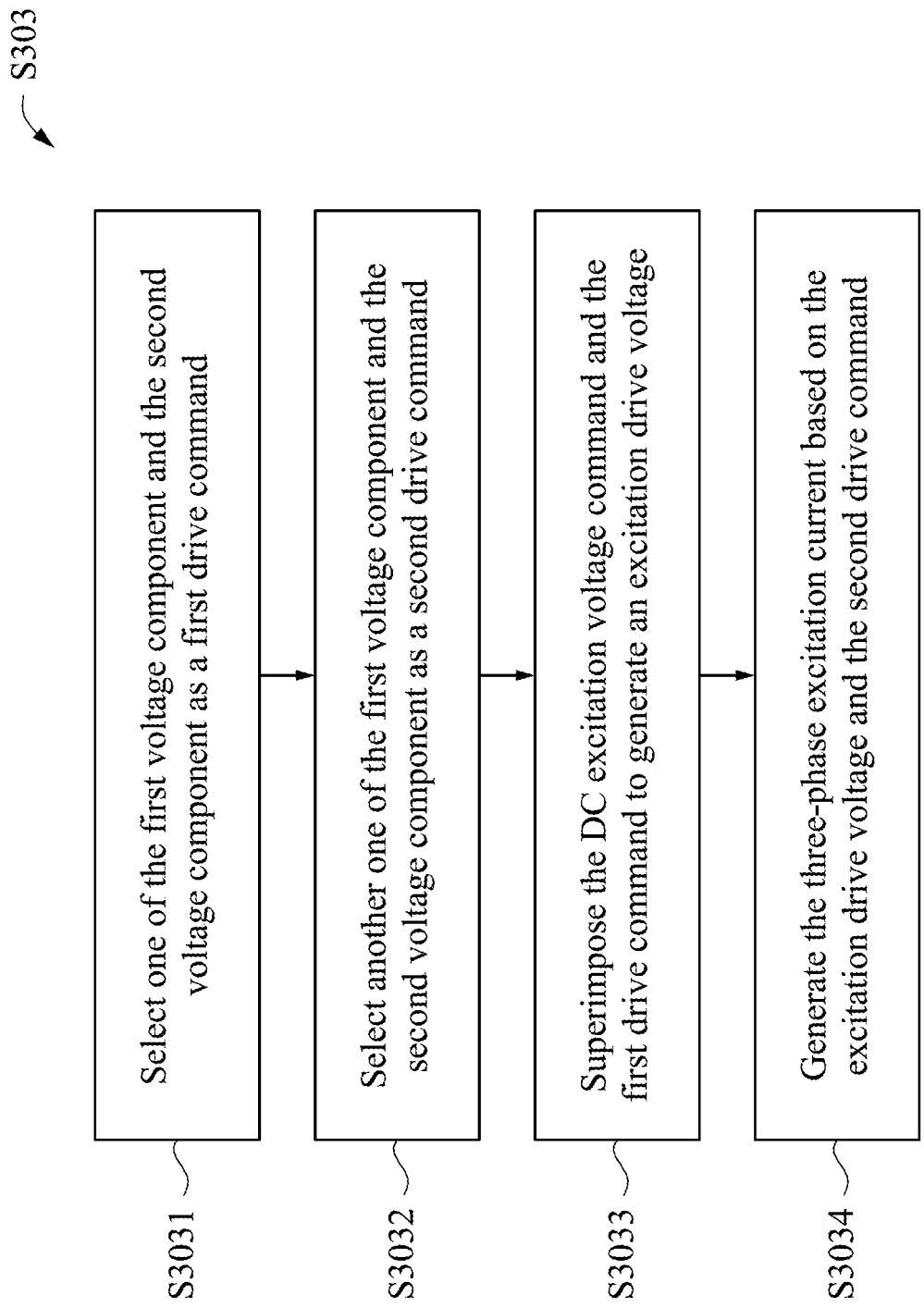
FIG. 3B depicts a flowchart of a method for generating a three-phase excitation current according to some embodiments of the present disclosure.

A description is provided with reference to FIG. 2, FIG. 3A, and FIG. 3B for illustration of various embodiments of the present disclosure. The present disclosure provides a motor control method 300, and the motor control method 300 is adapted for the synchronous motor 200 without the position sensor. The motor control method 300 is performed by the motor control device 100, and the motor control method 300 comprises steps S301-S308. In addition, step S303 further comprises steps S3031-S3034.

In step S301, the control arithmetic unit 110 adjusts a voltage component of the estimated voltage command (including the estimated d-axis voltage Vδ and the estimated q-axis voltage Vγ) to a steady-state voltage value. As shown in FIG. 2, in order to more accurately calculate the q-axis inductance Lq, the control arithmetic unit 110 can adjust the estimated d-axis voltage Vδ to the steady-state voltage value, and maintain the estimated q-axis voltage Vγ as a high-frequency AC signal. Or, in order to more accurately calculate the d-axis inductance Ld, the control arithmetic unit 110 can adjust the estimated q-axis voltage Vγ to the steady-state voltage value, and maintain the estimated d-axis voltage Vδ as the high-frequency AC signal. In a preferred embodiment, the steady-state voltage value can be designed as zero, but the present disclosure is not limited in this regard.

In step S302, a coordinate axis conversion is performed on another voltage component of the estimated voltage command and the steady-state voltage value to generate the two-axis voltage command. For example, as shown in FIG. 2, the control arithmetic unit 110 comprises a coordinate converter 111 and an inductance arithmetic unit 112, and the control arithmetic unit 110 adjusts the estimated q-axis voltage Vγ to the steady-state voltage value and maintains the estimated d-axis voltage Vδ as the high-frequency AC signal (the estimated d-axis voltage Vδ is regarded as the another voltage component of the estimated voltage command). The coordinate converter 111 performs the coordinate axis conversion on the estimated d-axis voltage Vδ and the steady-state voltage value to generate the first voltage component Vα and the second voltage component Vβ of the two-axis voltage command. Then, the control arithmetic unit 110 provides the first voltage component Vα and the second voltage component Vβ to the driving arithmetic unit 120. In the present embodiment, the estimated d-axis voltage Vδ and the estimated q-axis voltage Vγ indicate the estimated coordinated axes, and the first voltage component Vα and the second voltage component Vβ indicate stationary coordinate axes. However, the present disclosure is not limited in this regard.

After that, the calculation of the d-axis inductance Ld is taken for example to illustrate the coordinate conversion. As shown in FIG. 2 and FIG. 3A, in order to accurately calculate the d-axis inductance Ld, the control arithmetic unit 110 receives the estimated d-axis voltage Vδ and the estimated q-axis voltage Vγ of the estimated voltage command, and the control arithmetic unit 110 adjusts the estimated q-axis voltage Vγ to zero (that is, the steady-state voltage value in step S301), as shown in equation (3):

$$\begin{bmatrix} V_\delta \\ V_\gamma \end{bmatrix} = \begin{bmatrix} V_s \sin\omega t \\ 0 \end{bmatrix} \quad (3)$$

In equation (3), Vs sin ωt is the high-frequency AC signal received by the control arithmetic unit 110, which is regarded as the estimated d-axis voltage Vδ. Next, the coordinate axis conversion is performed based on equation (3) to obtain the first voltage component Vα and the second voltage component Vβ of the two-axis voltage command, as shown in equation (4):

$$\begin{bmatrix} V_\alpha \\ V_\beta \end{bmatrix} = \begin{bmatrix} \cos\theta_v & -\sin\theta_v \\ \sin\theta_v & \cos\theta_v \end{bmatrix} \begin{bmatrix} V_\delta \\ V_\gamma \end{bmatrix} \quad (4)$$

In equation (4), θv is the estimated value of a rotating position. It is noted that when the program is executed for the first time, the estimated value Θv of the rotating position is not obtained through feedback, but is a program setting value preset in the coordinate converter 111 or a position command from an outside. Therefore, the coordinate converter 111 performs the coordinate axis conversion based on the estimated d-axis voltage Vδ of the estimated voltage command and the steady-state voltage value to obtain the first voltage component Vα and the second voltage component Vβ of the two-axis voltage command.

Similarly, in other preferred embodiment of step S302, in order to accurately calculate the q-axis inductance Lq, the control arithmetic unit 110 receives the estimated d-axis voltage Vδ and the estimated q-axis voltage Vγ of the estimated voltage command, and the control arithmetic unit 110 adjusts the estimated d-axis voltage Vδ to zero (that is, the steady-state voltage value in step S301). After that, the coordinate converter 111 performs the coordinate axis conversion based on the estimated q-axis voltage Vγ of the estimated voltage command and the steady-state voltage value to obtain the first voltage component Vα and the second voltage component Vβ of the two-axis voltage command. Since the principle of the equations of the present embodiment can be obtained by modifying the equations (3) and (4), a description in this regard is not provided.

In step S303, after the driving arithmetic unit 120 receives the first voltage component Vα and the second voltage component Vβ output by the coordinate converter 111, the driving arithmetic unit 120 generates the three-phase excitation current Ia, Ib, Ic based on a DC excitation voltage command Vdc and the two-axis voltage command (including the first voltage component Vα or the second voltage component Vβ) to drive the synchronous motor 200 to the rotating position and stop. It is noted that, as for the rotating position (that is, the actual position Θa of the rotor 210) of the synchronous motor 200, since the position sensor is not used in the present embodiment, the motor control device 200 can not directly obtain an actual value of the rotating position.

A description is provided with reference to FIG. 2, FIG. 3A, and FIG. 3B for detailed illustration of the operation method of step S303. Step S303 comprises steps S3031-S3034. In step S3031, the driving arithmetic unit 120 selects one of the first voltage component Vα and the second voltage component Vβ as a first drive command. In step S3032, another one of the first voltage component Vα and the second voltage component Vβ is selected as a second drive command. For example, if the first voltage component Vα is selected as the first drive command, then the second voltage component Vβ is selected as the second drive command. Similarly, if the second voltage component Vβ is selected as the first drive command, then the first voltage component Vα is selected as the second drive command.

In step S3033, the driving arithmetic unit 120 superimposes the DC excitation voltage command Vdc and the first drive command to generate an excitation drive voltage Vt. In step S3034, the driving arithmetic unit 120 generates the three-phase excitation current Ia, Ib, Ic based on the excitation drive voltage Vt and the second drive command.

For example, if the first voltage component Vα is selected as the first drive command, the driving arithmetic unit 120 superimposes the DC excitation voltage command Vdc and the first voltage component Vα. Next, the second voltage component Vβ is selected as the second drive command. Therefore, the driving arithmetic unit 120 arranges the equation (4) and the DC excitation voltage command Vdc to obtain equation (5), as shown below:

$$\begin{bmatrix} V_t \\ V_\beta \end{bmatrix} = \begin{bmatrix} V_\alpha \\ V_\beta \end{bmatrix} + \begin{bmatrix} V_{dc} \\ 0 \end{bmatrix} \quad (5)$$

In equation (5), Vt is the excitation drive voltage. After the driving arithmetic unit 120 arranges the equations (3), (4) and (5), equation (6) can be obtained, as shown below:

$$\begin{bmatrix} V_t \\ V_\beta \end{bmatrix} = V_s \sin\omega t \begin{bmatrix} \cos\theta_v \\ \sin\theta_v \end{bmatrix} + \begin{bmatrix} V_{dc} \\ 0 \end{bmatrix} \quad (6)$$

Referring to equation (6), the driving arithmetic unit 120 generates the three-phase excitation current Ia, Ib, Ic based on the excitation drive voltage Vt and the second voltage component Vβ (that is, the second drive command).

Similarly, in steps S3033 and S3034, if the second voltage command Vβ is selected as the first voltage command, the driving arithmetic unit 120 superimposes the DC excitation voltage command Vdc and the second voltage component Vβ. Next, in step S3034, the driving arithmetic unit 120 generates the three-phase excitation current Ia, Ib, Ic based on the excitation drive voltage Vt and the first voltage component Vα (that is, the second drive command). In the present embodiment, those skilled in the art can modify the equations (5) and (6) to obtain the excitation drive voltage Vt and generate three-phase excitation current Ia, Ib, and Ic, and a description in this regard is not provided.

It is noted that FIG. 2 of the present disclosure is only used to describe an example, in which the first voltage component Vα is selected as the first drive command and the driving arithmetic unit 120 superimposes the DC excitation voltage command Vdc and the first voltage component Vα. In order to simplify the description of the present disclosure, the example in which the second voltage component Vβ is selected as the first drive command and the driving arithmetic unit 120 superimposes the DC excitation voltage command Vdc and the second voltage component Vβ is not depicted repeatedly.

In step S303, the driving arithmetic unit 120 generates the three-phase excitation current Ia, Ib, Ic to drive the synchronous motor 200 to rotate to the rotating position and stop. As shown in FIG. 2, the driving arithmetic unit 120 comprises a two-phase to three-phase converter 121 and a pulse width modulation (PWM) circuit 122. After the two-phase to three-phase converter 121 receives the excitation drive voltage Vt and the second voltage component Vβ (that is, the second drive command), the two-phase to three-phase converter 121 generates a three-phase voltage Va, Vb, Vc. The PWM circuit 122 switches the three-phase voltage Va, Vb, and Vc to generate the three-phase current Ia, Ib, and Ic. Or, in other embodiments, after the two-phase to three-phase converter 121 receives the excitation drive voltage Vt and the first voltage component Vα (that is, the second drive command), the two-phase to three-phase converter 121 generates the three-phase voltage Va, Vb, Vc. The PWM circuit 122 switches the three-phase voltage Va, Vb, and Vc to generate the three-phase excitation current Ia, Ib, and Ic.

In some embodiments, the objective of the driving arithmetic unit 120 receiving the DC excitation voltage command Vdc is to make a torque output by the synchronous motor 200 be zero, so that the synchronous motor 200 stops at a set rotating position. Generally speaking, the torque equation of the synchronous motor is shown as equation (7):

$$\tau_e = \frac{3}{2}\frac{P}{2}i_q[\lambda_m + (L_d + L_q)i_d] \quad (7)$$

In equation (7), τe is the torque output by the synchronous motor, P is a number of poles of the synchronous motor, iq is the q-axis current of the synchronous axes, id is the d-axis current of the synchronous axes, Ld represents the d-axis inductance, Lq represents the q-axis inductance, λm is a stator flux equivalent from a rotor flux.

Equation (8) can be obtained by converting equation (7) into the stationary coordinate axes (the α-axis and β-axis) and assuming the estimated value θv to be zero degree, as shown below:

$$\tau_e = -\frac{3}{2}\frac{P}{2}[i_a\lambda_m\sin\theta_{er} + i_a^2(L_d - L_q)]\sin\theta_{er}\cos\theta_{er} = 0 \quad (8)$$

As can be known from equation (8), the control device of the general synchronous motor can control the rotor of the synchronous motor to rotate to the rotating position and stop based on a DC excitation voltage. Therefore, in the present disclosure the synchronous motor 200 (the reluctance motor) can also employ the same principle as above to allow the rotor of the synchronous motor 200 to run to the rotating position and stop. Additionally, as can be known from equation (8), the d-axis inductance Ld and the q-axis inductance Lq of the reluctance motor are different from each other based on the structural characteristics of the reluctance motor. Hence, the output torque in equation (8) comprises the electromagnetic torque generated by the magnet component and the reluctance torque generated by the difference of inductances (Ld, Lq). When performing DC excitation (step S303), due to the combination of the two different torques, angles between the estimated coordinate axes (δ-axis, γ-axis) and the actual synchronous coordinate axes (d-axis and q-axis) are not zero when the torque is zero.

In step S304, the feedback arithmetic unit 130 retrieves the three-phase excitation current Ia, Ib, and Ic, and establishes the estimated coordinate axes based on the three-phase excitation current Ia, Ib, Ic to calculate an estimated current signal (including: the estimated d-axis current Iδ and the estimated q-axis current Iγ). One current component of the estimated current signal corresponds to the steady-state voltage value. It is noted that since the estimated voltage command and the estimated current signal correspond to the same estimated coordinate axes and the motor has been stopped (step S303), the estimated d-axis current Iδ corresponds to the estimated d-axis voltage Vδ and the estimated q-axis current Iγ corresponds to the estimate q-axis voltage Vγ. If the angular error Θer (FIG. 1B) is small, the estimated coordinate axes (δ-axis, γ-axis) and the synchronous coordinate axes (d-axis, q-axis) can be regarded as aligned. When the estimated coordinate axes are aligned with the synchronous coordinate axes, the estimated q-axis current Iγ corresponding to the steady-state voltage value (that is, when the estimated q-axis voltage Vγ is adjusted to the steady-state voltage value) can not be observed to have a frequency close to the high frequency AC signal of the estimated d-axis voltage Vδ. As a result, the estimated q-axis current Iγ is maintained at the steady-state voltage value. Conversely, if the angular error Θer (FIG. 1B) is large, the estimated coordinate axes (δ-axis, γ-axis) and the synchronous coordinate axes (d-axis, q-axis) are not aligned. When the estimated coordinate axes are not aligned with the synchronous coordinate axes, the estimated q-axis current Iγ corresponding to the steady-state voltage value (that is, when the estimated q-axis voltage Vγ is adjusted to the steady-state voltage value) can be observed to have the frequency close to the high frequency AC signal of the estimated d-axis voltage Vδ.

It is noted that if the motor is not stopped, there will be a coupling amount between the estimated voltage command and the estimated current signal, so that the estimated d-axis current Iδ can not accurately correspond to the d-axis voltage Vδ, and the estimated q-axis current Iγ can not accurately correspond to the q-axis voltage Vγ. Hence, if the control arithmetic unit 110 adjusts the estimated q-axis voltage Vγ to the steady-state voltage value (step S301), then the estimated q-axis current Iγ corresponds to the steady-state voltage value. Conversely, if the control arithmetic unit 110 adjusts the estimated d-axis voltage Vδ to the steady-state voltage value (step S301), then the estimated d-axis current Iδ corresponds to the steady-state voltage value.

As shown in FIG. 2, the feedback arithmetic unit 130 comprises a current sensing processing unit 131, a three-phase to two-phase converter 132, and a position estimator 133. The current sensing processing unit 131 retrieves an AC component of the three-phase excitation current Ia, Ib, Ic to output feedback AC signal components Ia_ac-Ic_ac to the three-phase to two-phase converter 132.

The three-phase to two-phase converter 132 establishes the estimated coordinate axes based on the feedback AC signal components Ia_ac-Ic_ac to calculate the estimated current signal (Iδ, Iγ). Since the operating principle of the three-phase to two-phase converter 132 is a technology well known to those skilled in the art, a description in this regard is not provided. In some embodiments, the current sensing processing unit 131 comprises a plurality of current sensors (not shown in the figure), and the plurality of current sensors are respectively configured to retrieve the feedback AC signal components Ia_ac-Ic_ac.

In step S305, the position estimator 133 determines whether the current component corresponding to the steady-state voltage value is maintained at the steady-state current value or not. Theoretically, if the control arithmetic unit 110 adjusts the estimated q-axis voltage Vγ to the steady-state voltage value (step S301), then the estimated q-axis current Iγ should be maintained at the steady-state current value. Conversely, if the control arithmetic unit 110 adjusts the estimated d-axis voltage Vδ to the steady-state voltage value (step S301), then the estimated d-axis current Iδ should be maintained at the steady-state current value.

However, as shown in FIG. 1A, since there is the angular error (that is, the actual position Θa of the rotor) between the synchronous coordinate axes (used for indicating the actual position of the rotor) and the estimated coordinate axes, the current component corresponding to the steady-state voltage value comprises the high-frequency AC signal and can not be maintained at the steady-state current value. For example, if the control arithmetic unit 110 adjusts the estimated q-axis voltage Vγ to the steady-state voltage value, then the estimated q-axis current Iγ comprises the high-frequency AC signal. Similarly, if the control arithmetic unit 110 adjusts the estimated d-axis voltage Vδ to the steady-state voltage value, then the estimated d-axis current Iδ comprises the high-frequency AC signal. If the position estimator 133 determines that the current component corresponding to the steady-state voltage value (the estimated d-axis current Iδ or the estimated q-axis current Iγ) is not maintained at the steady-state current value, the motor control device 100 proceeds to step S306.

In step S306, the position estimator 133 calculates the estimated value Θv of the rotating position of the synchronous motor 200 based on the estimated current signal (Iδ and Iγ), and provides it to the control arithmetic unit 110 and the three-phase to two-phase converter 132. The three-phase to two-phase converter 132 adjusts the estimated d-axis current Iδ and the estimated q-axis current Iγ of the estimated current signal based on the estimated value Θv to improve the accuracy of the estimated value Θv.

Based on the above, the position estimator 133 calculates the estimated value Θv of the rotating position of the synchronous motor 200 based on the estimated d-axis current Iδ or the estimated q-axis current Iγ. The calculation method can be referred to the reference: Chen, J., Tseng, S., Liu, T. (2012). Implementation of high-performance sensorless interior permanent-magnet synchronous motor control systems using a high-frequency injection technique. IET Electric Power Applications, 6(8), 533. doi: 10.1049/iet-epa.2011.0303. Therefore, the calculation method is not repeated in the present disclosure. However, the present disclosure is not limited in this regard.

In step S307, the control arithmetic unit 110 adjusts the another voltage component of the estimated voltage command based on the estimated value Θv of the rotating position, so that the current component corresponding to the steady-state voltage value is maintained at the steady-state current value. For example, when the control arithmetic unit 110 adjusts the estimated d-axis voltage Vδ to the steady-state voltage value, the control arithmetic unit 110 adjusts the estimated q-axis voltage Vγ based on the estimated value Θv of the rotating position so that the estimated d-axis current Iδ corresponding to the steady-state voltage value is maintained at the steady-state current value.

Or, in other embodiments, when the control arithmetic unit 110 adjusts the estimated q-axis voltage Vγ to the steady-state voltage value, the control arithmetic unit 110 adjusts the estimated d-axis voltage Vδ based on the estimated value Θv of the rotating position so that the estimated q-axis current Iγ corresponding to the steady-state voltage value is maintained at the steady-state current value. When the motor control device 100 completes step S307, the motor control device 100 returns to step S305: the position estimator 133 determines whether the current component corresponding to the steady-state voltage value is maintained at the steady-state current value or not.

When the position estimator 133 determines that the current component corresponding to the steady-state voltage value is maintained at the steady-state current value, the motor control device 100 proceeds to step S308.

In step S308, the control arithmetic unit 110 calculates an effective inductance of the synchronous motor (the d-axis inductance Ld or the q-axis inductance Lq) based on the steady-state voltage value, the another voltage component of the estimated voltage command, the steady-state current value, and another current component of the estimated current signal. Please refer to Table 1 below for illustration of the calculation method for adjusting each of the parameters:

TABLE 1

| Steady-state voltage value | Another voltage value | Steady-state current value | Another current component | Effective inductance |
|---|---|---|---|---|
| Estimated q-axis voltage Vγ | Estimated d-axis voltage Vδ | Estimated q-axis current Iγ | Estimated d-axis current Iδ | D-axis inductance Ld |
| Estimated d-axis voltage Vδ | Estimated q-axis voltage Vγ | Estimated d-axis current Iδ | Estimated q-axis current Iγ | Q-axis inductance Lq |

As can be known from Table 1 above, if the control arithmetic unit 110 selects the estimated q-axis voltage Vγ as the voltage component that is adjusted to the steady-state voltage value (that is, when the estimated q-axis voltage Vγ is adjusted to the steady-state voltage value), then: the another voltage component of the estimated voltage command is the estimated d-axis voltage Vδ, the current component corresponding to the steady-state voltage value is the estimated q-axis current Iγ, the another current component of the estimated current signal is the estimated d-axis current Iδ, and the effective inductance calculated is the d-axis inductance Ld.

If the control arithmetic unit 110 selects the estimated d-axis voltage Vδ as the voltage component that is adjusted to the steady-state voltage value (that is, when the estimated d-axis voltage Vδ is adjusted to the steady-state voltage value), then: the another voltage component of the estimated voltage command is the estimated q-axis voltage Vγ, the current component corresponding to the steady-state voltage value is the estimated d-axis current Iδ, the another current component of the estimated current signal is the estimated q-axis current Iγ, and the effective inductance calculated is the q-axis inductance Lq.

In a preferred embodiment, the steady-state voltage value is zero. However, the present disclosure is not limited in this regard. It is noted that in step S303, the driving arithmetic unit 120 adds the DC excitation voltage command Vdc to the stationary coordinate axes (Vα, Vβ). Owing to the DC excitation voltage command Vdc, the estimated q-axis current Iγ is maintained at a non-zero steady-state current value when the estimated quadrature voltage Vγ is adjusted to zero. Similarly, owing to the DC excitation voltage command Vdc, the estimated d-axis current Iδ is maintained at the non-zero steady-state current value when the estimated d-axis voltage Vδ is adjusted to zero.

Figure 4:
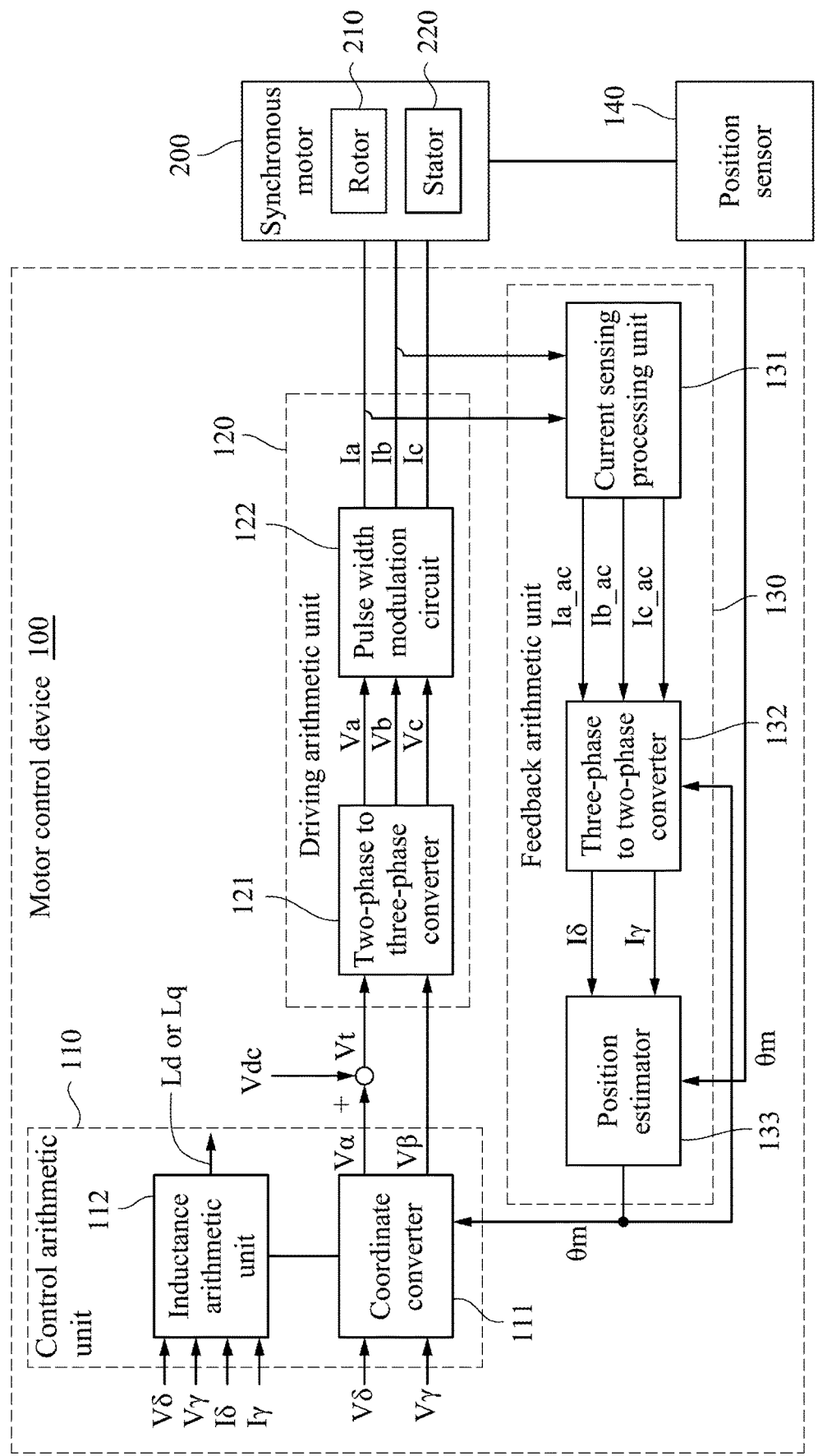
FIG. 4 depicts a schematic diagram of motor control device according to some embodiments of the present disclosure.
Figure 5A:
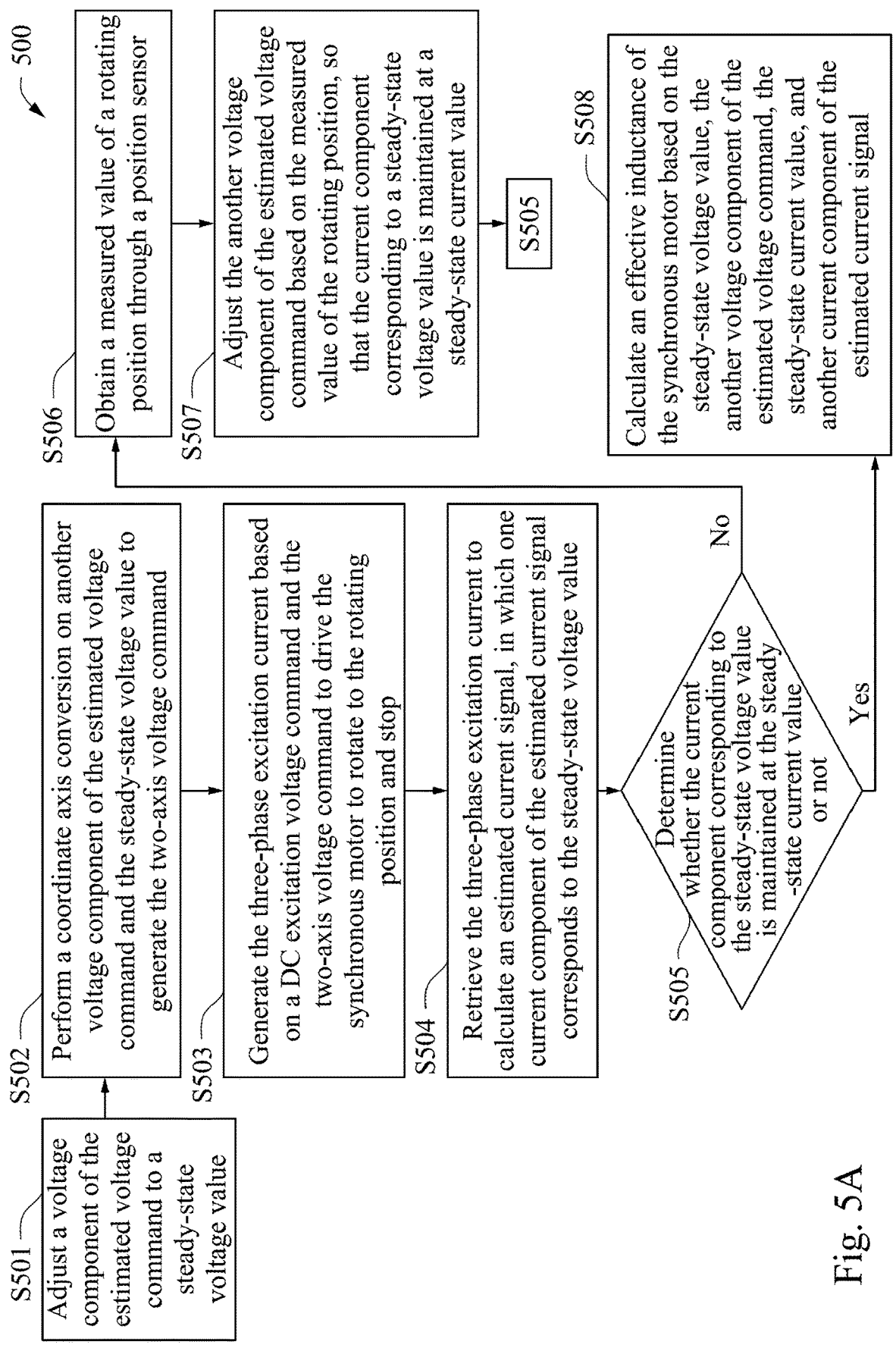
FIG. 5A depicts a flowchart of a motor control method according to some embodiments of the present disclosure.
Figure 5B:
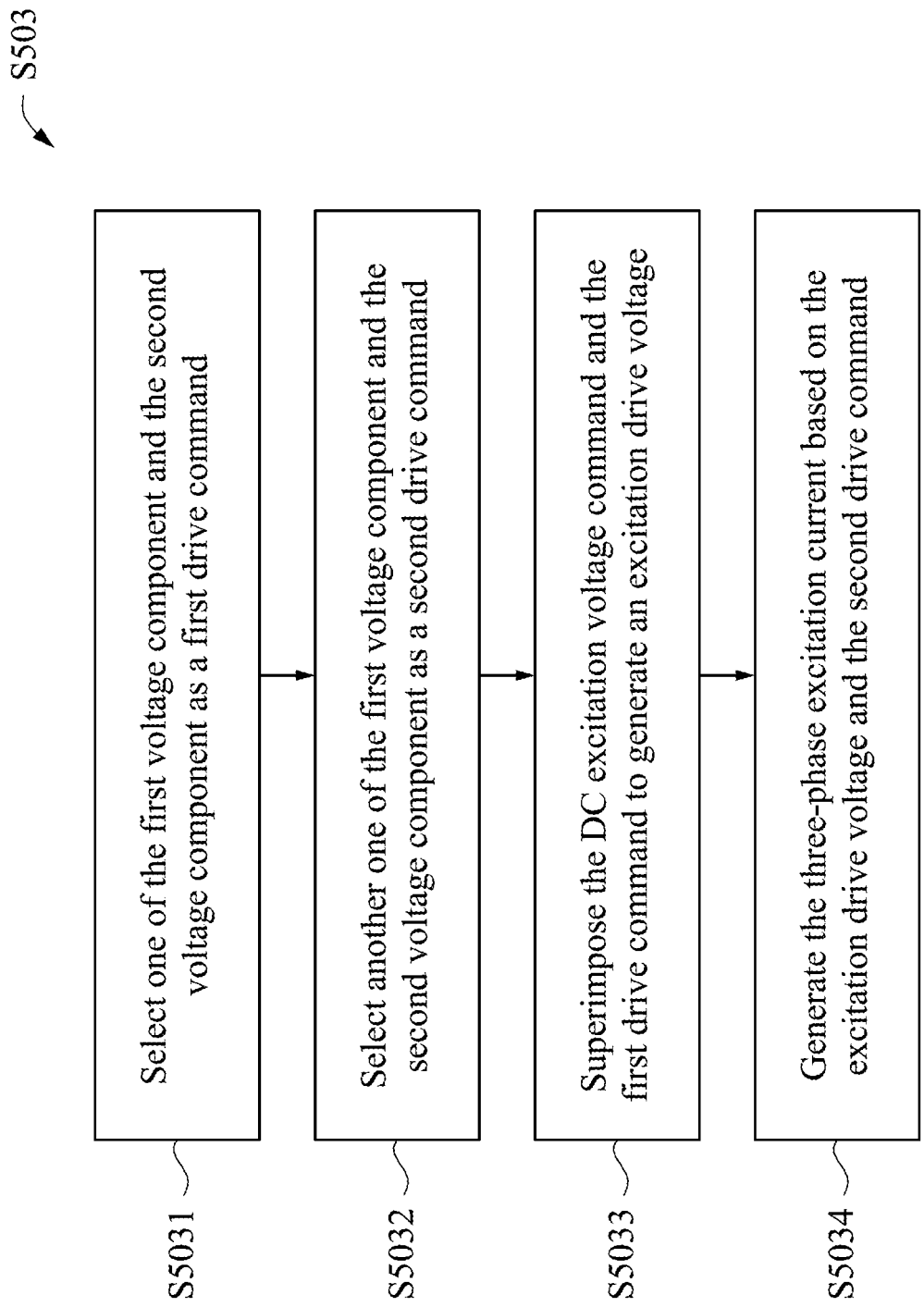
FIG. 5B depicts a flowchart of a method for generating a three-phase excitation current according to some embodiments the present disclosure.

FIG. 4 depicts a schematic diagram of a motor control device according to some embodiments of the present disclosure. FIG. 5A depicts a flowchart of a motor control device according to some embodiments of the present disclosure. FIG. 5B depicts a flowchart of a method of generating a three-phase excitation current according to some embodiments of the present disclosure. A description is provided with reference to FIG. 4, FIG. 5A, and FIG. 5B for illustration of various embodiments as follows.

The present disclosure provides a motor control method 500, the motor control method 500 is adapted for the synchronous motor 200 with a position sensor 140 (such as an encoder), and the position sensor 140 is coupled to the synchronous motor 200. The motor control method 500 is performed by the motor control device 100, and the motor control method 500 comprises steps S501-S505.

Since the operation method of steps S501-S505 is the same as steps S301-S305, a description in this regard is not provided. Similarly, the operation method of steps S5031-S5034 is the same as steps S3031-S3034, so a description in this regard is not provided.

In step S506, the position sensor 140 measures a rotating position of the rotor 210 of the synchronous motor 200, and outputs a measured value Θm to the position estimator 133 of the feedback arithmetic unit 130. Therefore, the position estimator 133 of the feedback arithmetic unit 130 obtains the measured value Θm of the rotating position through the position sensor 140. Next, the position estimator 133 outputs the measured value Θm of the rotating position to the control arithmetic unit 110. In addition to that, when the motor control device 100 performs step S506, the feedback arithmetic unit 130 still retrieves the feedback AC signal components Ia_ac-Ic_ac of the three-phase excitation current Ia, Ib, Ic of the synchronous motor 200 to calculate an estimated current signal (Iδ, Iγ) (the same as step S304, so a description in this regard is not provided).

It is noted that the position sensor 140 can be disposed inside or outside the motor control device 100 depending on different situations. However, the present disclosure is not limited in this regard.

In step S507, the control arithmetic unit 110 adjusts another voltage component of the estimated voltage command based on the measured value Θm of the rotating position, so that a current component corresponding to a steady-state voltage value is maintained at a steady-state current value (the method is similar to step S307). Since the operation method of steps S507-S508 is the same as steps S307 and S308, a description in this regard is not repeated.

Therefore, in the synchronous motor 200 with the position sensor 140, the motor control device 100 similarly can calculate a d-axis inductance or a q-axis inductance of the synchronous motor 200 based on the d-axis voltage Vδ, the q-axis voltage Vγ, the d-axis current signal Iδ, and the q-axis current signal Iγ when the current component corresponding to the steady-state voltage value is maintained at the steady-state current value, according to the steps shown in FIG. 3. The motor control device 100 measures the rotating position of the synchronous motor 200 through the position sensor 140 instead of evaluating the rotating position of the synchronous motor 200 through the estimated current signal (Iδ, Iγ). As a result, in the present embodiment, the motor control device 100 can omit complicated calculations, and can more effectively reduce the influence caused by the actual position Θa of the rotor.

In summary, the focus of the present disclosure is to calculate the excitation angle value based on the estimated voltage command, and control the rotor of the synchronous motor 200 to rotate to the rotating position and stop. After that, the position error between the rotor position and the excitation angle value can be reduced by detecting or calculating the rotor position of the synchronous motor 200. As a result, the present disclosure can more accurately calculate the d-axis inductance or the q-axis inductance of the synchronous motor 200.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A motor control method used for a synchronous motor without a position sensor, the motor control method comprising:
    adjusting a voltage component of an estimated voltage command to a steady-state voltage value;
    performing a coordinate axis conversion on another voltage component of the estimated voltage command and the steady-state voltage value to generate a two-axis voltage command;
    generating a three-phase excitation current to drive the synchronous motor to a rotating position and stop based on a DC excitation voltage command and the two-axis voltage command;
    retrieving the three-phase excitation current to calculate an estimated current signal, wherein a current component of the estimated current signal corresponds to the steady-state voltage value;
    calculating an estimated value of the rotating position based on the estimated current signal when determining that the current component is not maintained at a steady-state current value;
    adjusting the another voltage component of the estimated voltage command based on the estimated value of the rotating position, so that the current component corresponding to the steady-state voltage value is maintained at the steady-state current value; and
    calculating an effective inductance of the synchronous motor based on the steady-state voltage value, the another voltage component of the estimated voltage command, the steady-state current value, and another current component of the estimated current command when determining that the current component is maintained at the steady-state current value.

2. The motor control method of claim 1, wherein the two-axis voltage command comprises a first voltage component and a second voltage component, and the motor control method further comprises:
    selecting one of the first voltage component and the second voltage component as a first drive command;
    selecting another one of the first voltage component and the second voltage component as a second drive command;
    superimposing the DC excitation voltage command and the first drive command to generate an excitation drive voltage; and
    generating the three-phase excitation current based on the excitation drive voltage and the second drive command.

3. The motor control method of claim 1, wherein the estimated voltage command comprises an estimated d-axis voltage and an estimated q-axis voltage q-axis voltage, and the estimated current signal comprises an estimated d-axis current and an estimated q-axis current.

4. The motor control method of claim 3, further comprising:
    adjusting the estimated d-axis current and the estimated q-axis current of the estimated current signal based on the estimated value of the rotating position.

5. The motor control method of claim 3, wherein the estimated q-axis voltage q-axis voltage of the estimated voltage command is adjusted to the steady-state voltage value, the another voltage component of the estimated voltage command is the estimated d-axis voltage, the current component corresponding to the steady-state voltage value is the estimated q-axis current, the another current component of the estimated current signal is the estimated d-axis current, and the effective inductance is a d-axis inductance.

6. The motor control method of claim 3, wherein the estimated d-axis voltage of the estimated voltage command is adjusted to the steady-state voltage value, the another voltage component of the estimated voltage command is the estimated q-axis voltage, the current component corresponding to the steady-state voltage value is the estimated d-axis current, the another current component of the estimated current signal is the estimated q-axis current, and the effective inductance is a q-axis inductance.

7. The motor control method of claim 1, wherein the steady-state voltage value is zero.

8. A motor control method used for a synchronous motor, wherein a position sensor is coupled to the synchronous motor, and the motor control method comprises:
    adjusting a voltage component of an estimated voltage command to a steady-state voltage value;
    performing a coordinate axis conversion on another voltage component of the estimated voltage command and the steady-state voltage value to generate a two-axis voltage command;
    generating a three-phase excitation current to drive the synchronous motor to a rotating position and stop based on a DC excitation voltage command and the two-axis voltage command;
    retrieving the three-phase excitation current to calculate an estimated current signal, wherein a current component of the estimated current signal corresponds to the steady-state voltage value;

obtaining a measured value of the rotating position through the position sensor when determining that the current component is not maintained at a steady-state current value;

adjusting the another voltage component of the estimated voltage command based on the measured value of the rotating position, so that the current component corresponding to the steady-state voltage value is maintained at the steady-state current value; and calculating an effective inductance of the synchronous motor based on the steady-state voltage value, the another voltage component of the estimated voltage command, the steady-state current value, and another current component of the estimated current command when determining that the current component is maintained at the steady-state current value.

9. The motor control method of claim 8, wherein the two-axis voltage command comprises a first voltage component and a second voltage component, and the motor control method further comprises:

selecting one of the first voltage component and the second voltage component as a first drive command;

selecting another one of the first voltage component and the second voltage component as a second drive command;

superimposing the DC excitation voltage command and the first drive command to generate an excitation drive voltage; and generating the three-phase excitation current based on the excitation drive voltage and the second drive command.

10. The motor control method of claim 8, wherein the estimated voltage command comprises an estimated d-axis voltage and an estimated q-axis voltage q-axis voltage, and the estimated current signal comprises an estimated d-axis current and an estimated q-axis current.

11. The motor control method of claim 10, further comprising:

adjusting the estimated d-axis current and the estimated q-axis current of the estimated current signal based on the measured value of the rotating position.

12. The motor control method of claim 10, wherein the estimated q-axis voltage q-axis voltage of the estimated voltage command is adjusted to the steady-state voltage value, the another voltage component of the estimated voltage command is the estimated d-axis voltage, the current component corresponding to the steady-state voltage value is the estimated q-axis current, the another current component of the estimated current signal is the estimated d-axis current, and the effective inductance is a d-axis inductance.

13. The motor control method of claim 10, wherein the estimated d-axis voltage of the estimated voltage command is adjusted to the steady-state voltage value, the another voltage component of the estimated voltage command is the estimated q-axis voltage, the current component corresponding to the steady-state voltage value is the estimated d-axis current, the another current component of the estimated current signal is the estimated q-axis current, and the effective inductance is a q-axis inductance.

14. The motor control method of claim 8, wherein the steady-state voltage value is zero.

* * * * *